(12) United States Patent
Pancorbo Marcos et al.

(10) Patent No.: US 8,700,040 B2
(45) Date of Patent: Apr. 15, 2014

(54) BEARER CONTROL MODE (NW-ONLY OR USER-ONLY) HANDLING IN INTERSYSTEM HANDOVER

(75) Inventors: Belen Pancorbo Marcos, Madrid (ES); Dirk Kopplin, Ytterby (SE); Lars Gunnar Lövsén, Göteborg (SE); Susana Fernandez Alonso, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 537 days.

(21) Appl. No.: 12/990,314

(22) PCT Filed: Dec. 22, 2008

(86) PCT No.: PCT/EP2008/068137
§ 371 (c)(1), (2), (4) Date: Oct. 29, 2010

(87) PCT Pub. No.: WO2009/132722
PCT Pub. Date: Nov. 5, 2009

(65) Prior Publication Data
US 2011/0065435 A1    Mar. 17, 2011

Related U.S. Application Data

(60) Provisional application No. 61/048,971, filed on Apr. 30, 2008.

(51) Int. Cl.
*H04W 36/00* (2009.01)

(52) U.S. Cl.
USPC ........... 455/436; 370/331; 370/352; 370/356; 370/401

(58) Field of Classification Search
USPC ........... 455/432.1–432.3, 434, 436–445, 560, 455/561; 370/328, 370, 400–402, 331–338, 370/352–356
See application file for complete search history.

(56) References Cited

U.S. PATENT DOCUMENTS

| | | | | | |
|---|---|---|---|---|---|
| 6,002,689 | A | * | 12/1999 | Christie et al. | 370/401 |
| 6,141,339 | A | * | 10/2000 | Kaplan et al. | 370/395.61 |
| 6,621,793 | B2 | * | 9/2003 | Widegren et al. | 370/230.1 |
| 6,721,565 | B1 | * | 4/2004 | Ejzak et al. | 455/436 |
| 8,144,650 | B2 | * | 3/2012 | Olsson et al. | 370/328 |

(Continued)

OTHER PUBLICATIONS

Technical specification group services and system aspects; General packet radio service enhancements for evolved universal terrestrial radio access network (E-UTRAN) access (Release 8), 3GPP TS 23.041 v8.1.0 3$^{rd}$ Generation Partnership Project, vol. 5A, Mar. 2008, pp. 1-171.

(Continued)

*Primary Examiner* — Sharad Rampuria

(57) ABSTRACT

A method, a gateway node, a policy control node and a infrastructure network for handling a handover of a User Equipment communicating wirelessly with the infrastructure network. A first gateway node receives handover information indicative of a handover of the user equipment between two radio access networks the first gateway node determining a bearer control mode on the basis of the handover information the first gateway node transmitting control information determined on the basis of the bearer control mode to a policy control node the first gateway node controlling the bearer binding on the basis of the bearer control mode.

13 Claims, 11 Drawing Sheets

(56) References Cited

U.S. PATENT DOCUMENTS

| | | | |
|---|---|---|---|
| 8,442,522 B2 * | 5/2013 | Pancorbo Marcos et al. | 455/432.1 |
| 8,553,647 B2 * | 10/2013 | Akhtar | 370/331 |
| 2003/0165135 A1 * | 9/2003 | Itzkovitz et al. | 370/352 |
| 2005/0073990 A1 * | 4/2005 | Chang et al. | 370/349 |
| 2007/0211694 A1 * | 9/2007 | Rasanen | 370/352 |
| 2008/0181178 A1 * | 7/2008 | Shaheen | 370/331 |
| 2010/0154029 A1 * | 6/2010 | Fernandez Alonso et al. | 726/1 |
| 2011/0170411 A1 * | 7/2011 | Wang et al. | 370/235 |
| 2012/0188980 A1 * | 7/2012 | Wang et al. | 370/331 |
| 2012/0202491 A1 * | 8/2012 | Fox et al. | 455/435.1 |
| 2012/0246325 A1 * | 9/2012 | Pancorbo Marcos et al. | 709/227 |

OTHER PUBLICATIONS

"Universal Mobile Telecommunications System (UMTS); Policy and charging control over Gx reference point (3GPP TS 29.212 version 7.4.0 Release7 ); ETSI TS 129 212" ETSI Standards, Lis, Sophia Antipolis Cedex, France, vol. 3-CT3, No. V7.4.0. Apr. 1, 2008.

* cited by examiner

BEARER CONTROL MODE (NW-ONLY OR USER-ONLY) HANDLING IN INTERSYSTEM HANDOVER

This application claims the benefit of U.S. Provisional Application No. 61/048,971, filed Apr. 20, 2008, the disclosure of which is fully incorporated herein by reference.

TECHNICAL FIELD

The present invention relates to a solution for providing handling of bearer control in a wireless communication network between different networks and/or network types while keeping active PDP contexts alive during transition.

BACKGROUND OF THE INVENTION

In 3GPP Rel-7 network init PDP context procedures have been introduced. Since network wide support from terminals and SGSN and GGSN for network init procedures cannot be expected from day one a bearer control mode (BCM) procedure has been defined. BCM may be different depending on access type as follows:

For E-UTRAN access, EPS bearers are used. There are two flavors of EPS bearers default and dedicated. Dedicated Bearers are always established, modified and removed by the network. The GW is responsible to initiate, remove or modify an EPS bearer.

For pre rel-8 2G/3G access the PDP context may be established by the network or by the UE. The selection of the BCM depends on network and UE capabilities and is negotiated at IP-CAN session establishment and applies for all PDP contexts within that IP-CAN session. The selected bearer control mode may be modified during the lifetime of an IP-CAN session due to a UE moving to a SGSN not supporting the selected bearer control model. The BCM may be 'NW-only' or 'UE-only' or 'NW and UE'.

However, in spite of the different bearer control modes and network capabilities, 3GPP Rel-8 has not considered yet the implications of attaching from accesses networks that handles the bearers in a different way and the handover cases between these networks.

The current PCC architecture specified the BCM negotiation. According to it, the PCRF decides the BCM to be used by the network, based on the network capabilities, the UE preferences and other possible criteria.

The Bearer Control Mode set to 'UE-only' means that the PCRF performs bearer binding The PCRF compare the TFT(s) of all IP-CAN bearers within an IP-CAN session with the generated PCC Rules waiting to be installed/modified or removed. The PCRF indicates to the PCEF the IP-CAN bearer within the IP-CAN session where the PCC Rules shall be installed or removed.

The Bearer Control Mode set to "NW-only" means that the PCEF performs bearer binding. The PCRF installs, modifies or removes PCC Rules over Gx interface to the PCEF. The PCEF checks if a bearer is established with the QCI and ARP indicated by the PCC Rule and associates these PCC Rules to the IP-CAN bearer that has the same QCI, ARP values.

In the BCM 'NW-only' the trigger to establish or modify a bearer is the PCRF installing PCC Rules over Gx. However, the PCRF may install PCC Rules either due to the UE requesting resources for a service or unconditionally when the service session information is received over Rx.

The Bearer Control Mode set to 'UE-NW' means that both the PCRF and PCEF performs bearer binding. PCRF performs the bearer binding for those services for which the UE requests a bearer establishment/modification and the PCEF performs the bearer binding for those services for which the PCEF requests a bearer establishment/modification.

There are also other non-3GPP legacy access networks where the bearer establishment may also be done by the User Equipment. One example is 3GPP2, where the standard solution is fully based on what 3GPP has defined in Release 7. Same considerations should then be taken into account for these cases.

Rel-8 EPS has defined a generic architecture that, in principle should allow the EPS user to access from different kind of access networks and perform inter-access handover.

The assumption for EPS is that PCC architecture corresponds to a bearer agnostic model where the GW is in charge of the bearer binding meanwhile PCRF will have the control at service level The following problem with current PCC architecture can be seen:

1. No bearer control has been defined for Gxx interface. It means that for the GERAN/UTRAN access to EPS using PMIP in the S5 interface, there is no mechanism defined for negotiation of the BCM, nor having this negotiation at the PCRF. Consequently, both the BBERF and the PCRF assumes that the default BCM applies ('UE-only' as defined in Rel-7). The consequence is that it will not be possible to perform bearer binding at the BBERF for an EPS attached to EPS using a GERAN/UTRAN access network with PMIP over S5.

2. It is not specified any mechanism to change the BCM during the lifetime of the IP-CAN session. That means that it is unpredictable and may vary depending on the network implementation which the network behavior is when an UE attached to a network that works in UE-init mode moves to a network that works in NW-init mode. It may occur that existing bearers cannot be modified any longer or that the IP-CAN session cannot be retained.
   An IP-CAN session modification occurs for an IP-CAN session with BCM set to 'UE and NW' (e.g. in E-UTRAN):
   An IP-CAN session modification occurs for an IP-CAN session with BCM set to 'UE-only':

If BCM is modified from 'UE only' to 'UE and NW', the bearer binding should be performed by the GW from now on. However, there are no mechanisms today to transfer such responsibility. Given the change of the bearer binding responsibility requires a mechanism how to maintain the existing bearers and installed PCC/QoS Rules, when a different bearer control mode is selected i.e. PCRF or GW responsibility.

SUMMARY OF THE INVENTION

It is an object of the present invention to remedy at least some of the problems described in the introduction part and to provide an improved BCM procedure in a PCC. The object is solved by means of a method, a gateway node, a policy control node and an infrastructure network according to the independent claims. The dependent claims describe further embodiments.

The solution relates to a method for handling a handover of a User Equipment, UE, communicating wirelessly with an infrastructure network. The method comprises the steps of:
A first gateway node receives handover information indicative of a handover of the user equipment between two radio access networks.
The first gateway node determines a bearer control mode on the basis of the handover information.

The first gateway node transmits control information determined on the basis of the bearer control mode to a policy control node.

The first gateway node controls the bearer binding on the basis of the bearer control mode.

The solution furthermore relates to a gateway node being adapted to for handle handover of a user equipment, UE, communicating wirelessly with an infrastructure network. The gateway node is further adapted to:
- receive handover information indicative of a handover of the user equipment between two radio access networks,
- determine a bearer control mode on the basis of the handover information,
- transmit control information determined on the basis of the bearer control mode to a policy control node.
- control the bearer binding on the basis of the bearer control mode.

The solution also relates to a policy control node being adapted to handle handover of a user equipment, UE, communicating wirelessly with an infrastructure network. The policy control node is further adapted to receive control information from a gateway node, the information being determined on the basis of a bearer control mode indicating a handover of the user equipment between two radio access networks.

The solution finally relates to a infrastructure network being adapted to handle handover of a user equipment, UE, communicating wirelessly with an infrastructure network, the system comprising at least one gateway node and at least one policy control node. The system is further adapted to:
- receive in a first gateway node handover information indicative of a handover of the user equipment between two radio access networks,
- determine in the first gateway node a bearer control mode on the basis of the handover information,
- transmit from the first gateway node control information determined on the basis of the bearer control mode to the policy control node,
- control in the first gateway node the bearer binding on the basis of the bearer control mode.

With the invention, PDP Context/EPS Bearers is allowed to be maintained, due to changes of BCM. The PCC rules are also allowed to be maintained due to change of BCM. Service continuity is further allowed, while avoiding PDP context/EPS Bearer interruptions due QoS or BCM re-negotiations. A user is also allowed to move between different kinds of access networks without loosing connectivity. Finally, user perception is not affected.

The invention furthermore provides a straightforward migration to Rel-8 networks. Delegation of bearer control allows the operator to have more flexibility in the control of the bearers, and may be more respectful with the current bearer control in every access network. Delegation of bearer control allows the operator to maintain backward compatibility with Rel-7 PCC deployments. Bearer agnostic PCRF allows keeping bearer control in the GW regardless of how the bearers are handled in the access network.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

The embodiments of the invention with further developments described in the following are to be regarded only as examples and are in no way to limit the scope of the protection provided by the patent claims.

Figure 1:
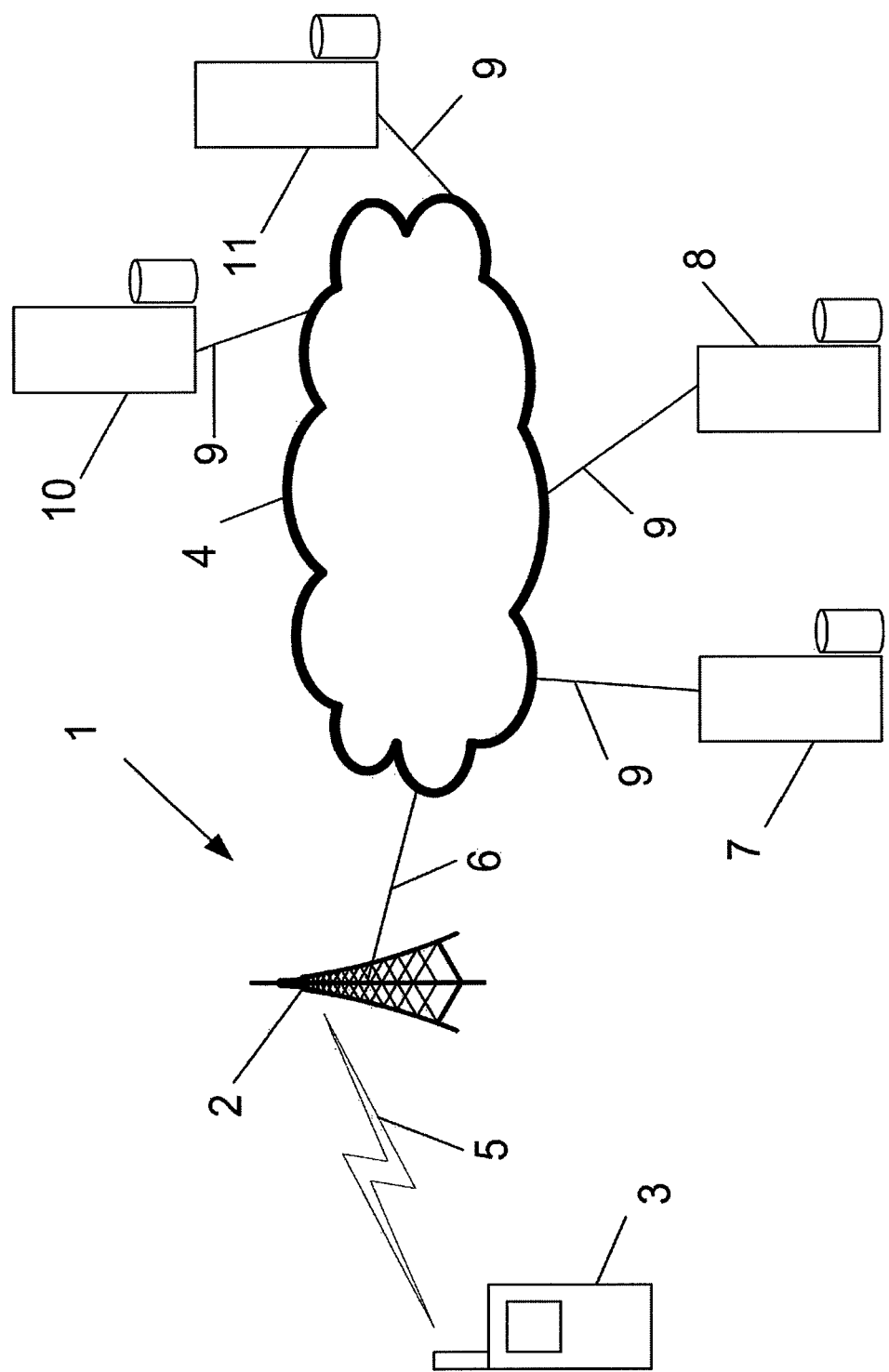
FIG. 1 illustrates schematically in a block diagram a network according to the present invention.

In FIG. 1 reference numeral 1 generally indicate an access network, in the following named as the "network", according to the present invention. The network 1 will in the following be exemplified by a GSM EDGE Radio Access Network, GERAN or an UMTS Terrestial Radio Access Network, UTRAN, or an Envolved Universal Terrestrial Radio Access Network, E-UTRAN.

The network comprises a base station (BS) or some other network access gateway (NGW) 2 which mobile station (UE) 3 may communicate with using suitable wireless interface 5. The BS/NGW is connected in any suitable way 6 to a communication infrastructure network 4 which in turn may be connected to a public network (not shown), e.g. the Internet.

In the infrastructure network one or several mobility, connection, subscription management devices/services/servers 7, 8, 10, 11 may be attached in order to provide mobility and/or connection management of the UE. These mobility/connection management devices 7, 8, 10, 11 may be connected to the infrastructure network using any suitable connection type 9 or may also be incorporated into the infrastructure network itself. Furthermore, the management devices 7, 8, 10, 11 may be connected 9 to the infrastructure network 4 (connected directly or in-directly to the infrastructure network 4).

A mobility management device may comprise for instance a mobility control node, which in the following will be exemplified by a mobility management entity (MME) or an SGSN. Other management devices may include for instance a first gateway node which in the following will be exemplified by a gateway node (GW), an E-UTRAN, an Operators management device(s), and a policy control node, which in the following will be exemplified by a PCRF. It should be understood that several management devices of the same character may be present depending on the infrastructure network configuration and scenario.

It should be noted that with the term base station is meant an entity acting as an access gateway to an access network with a wireless connection to UE's and other devices in connection with the access network and further connected to a communication network. With the term UE is meant an entity not part of an infrastructure network but that communicate wirelessly with the infrastructure network (e.g. a mobile phone, a PDA, a laptop, a network connected sensor device, and so on).

The wireless communication between the UE and BS may be any suitable type using packet based communication, e.g. WLAN, WiMax, Wi-Fi, CDMA2000, GPRS, 2G/3G, and so on as understood by the skilled person. The BS may provide several different types of communication interfaces, for instance both GPRS and WLAN at the same time and the UE may choose between these two types depending on different parameters (Link quality, range, QoS, monetary, operator, and so on). Alternatively, the UE may perform a handover between different communication types located on different BS and/or due to moving from one BS cell to another.

Depending on type of connection between the BS and the UE, initially different mobility management and/or connection management devices may be in operation. In case the UE has a relation to a network operator, a home subscriber system (HSS) keeps track of the UE.

Figure 2:
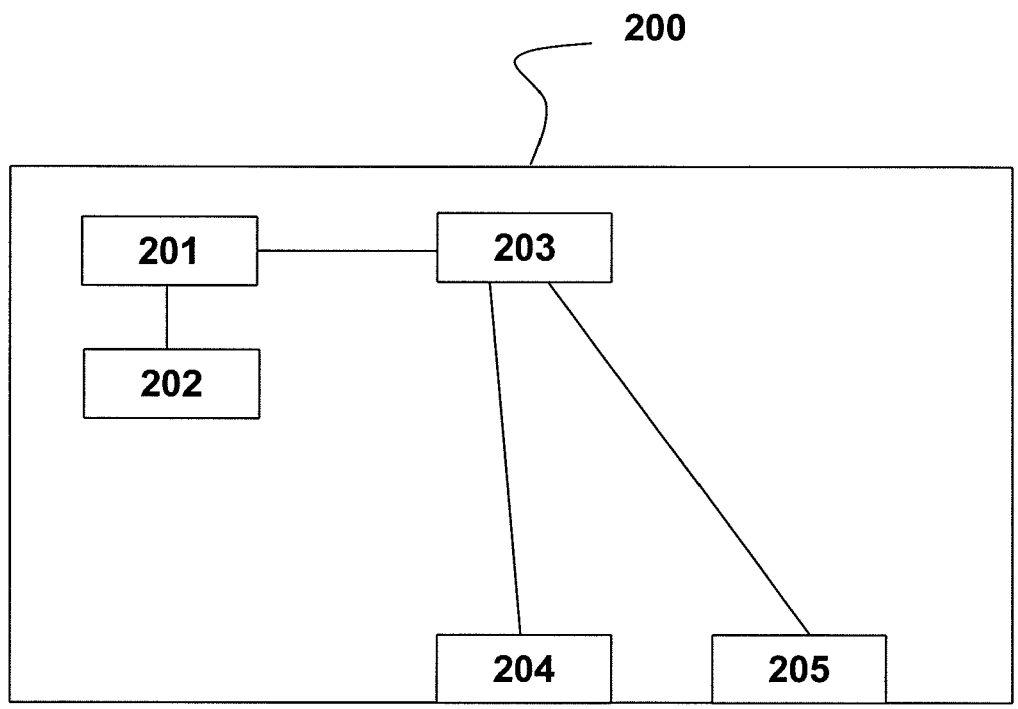
FIG. 2 illustrates schematically a device according to the present invention.

The present invention may be implemented in an infrastructure device 200 as shown in FIG. 2. The infrastructure device 200 may comprise a processing unit 201, at least one memory unit 202, and at least one communication control unit 203 handling communication using at least one communication interface 204, 205. The device 200 is arranged to communicate with the infrastructure network 4 and entities connected to the network 4 as well as entities connected to a public network in turn connected to the infrastructure network 4. It should be understood by the skilled person that other units may be present in the device depending on configuration and tasks performed by the device; however, these are not shown since they are of no importance for the present invention.

The processor is arranged to operate processing instructions and/or instruction sets for communicating control and/or data signals/messages to and from other entities of the communication infrastructure as well as from any UE in communication with the wireless network infrastructure. It should be noted that instructions may be interpreted as software or hardware instructions. The processor may be any suitable type including e.g. a microprocessor, an ASIC (Application Specific Integrated Circuit), a DSP (Digital Signal Processor), or an FPGA (Field Programmable Gate Array). The memory unit may be any suitable including volatile and/or non-volatile memory types, e.g. a hard disk, floppy disk, Flash memory types, RAM, DRAM, and so on as understood by the skilled person.

The instructions/instruction sets may be distributable to the device 200 using any suitable means, e.g. using the network connection or non-volatile distributable memory units.

The basic concept of the present invention resides in allowing an EPS subscriber to make handover from the different access networks that can behave according to different bearer control modes of operations without impacting the user perception, and thus, keeping alive the PDP Context(s) the user are currently using.

Two solutions illustrating the concept of the present invention will now be described. These two solutions describe among others, a scenario where the first gateway node makes the bearer binding. In these solutions, the first gateway node is exemplified by a GW, such as a GGSN and/or a PDN-GW.

The second gate node is exemplified by a SGSN and/or a S-GW and the policy control node is exemplified by a PCRF. The UE is exemplified by an EPS subscriber. It should furthermore be realized by a person skilled in the art that bearer control mode can also be UE/NW-only, in which mode the GW also makes the bearer binding.

The GW may perform the bearer binding, as exemplified in solution 1 and 2 below. If so, the GW then firstly receives handover information indicative of a handover of the user equipment between two radio access networks. The GW secondly determines a bearer control mode on the basis of the handover information and the GW thirdly transmits control information determined on the basis of the bearer control mode to the PCRF. The GW finally controls the bearer binding on the basis of the bearer control mode.

Moreover, the S-GW or SGSN, determines and transmits the handover information determined on the basis of the handover of the UE. The control information comprises a policy request, wherein the policy request comprises policy rules. The PCRF transmits a policy answer to the GW in response to the policy request. The policy answer comprises policy rules.

Solution 1: Bearer Control Mode Delegation

This solution is based on the delegation of the bearer control mode to a different entity (PCRF or GW) according to the principles used in Rel-7, that is, the PCRF will make the bearer binding when the bearer control mode is UE-only and the GW will make the bearer binding when the bearer control mode is NW-only (or UE/NW-only as mentioned earlier).

This requires the basic following additions to current procedures:

The GW has to analyze the bearer control mode of operation based on the kind of access network and provide it to the PCRF and if necessary, provide also with the necessary information to change the node responsibility:

When the UE is already attached to a network that works in NW-only mode (i.e. the GW makes the bearer binding) and moves to a network that works in UE-only mode, the GW has to provide PCRF with the bearer information.

When the UE is attached to a network that works in NW-only mode (i.e. the PCRF makes the bearer binding) and moves to a network that works in UE-only mode, the GW has to inform PCRF to indicate that now a different BCM applies Solution 2: Bearer Agnostic PCRF This solution is based on the full bearer binding control in the GW regardless of the bearer control mode of operation and the access network the user has attached. This requires the basic following additions to current procedures:

When the UE attaches to a EPS using a GPRS access and initiates a PDP-context operation:

the GGSN/PDN-GW has to convert such request into a bearer agnostic request towards the PCRF, i.e. extract the set of TFT filters and the requested QoS the PCRF has to make PCC rule binding, i.e. identify the PCC rules that apply to that set of TFT filters, and provide the authorized QoS per Service Data Flow.

When a UE attaches to a EPS network using E-UTRAN access and moves to a GPRS access:

the GGSN/PDN-GW or the S-GW informs PCRF about IP-CAN session modification due to change of RAT.

the PCRF updates PCC Rules.

When the UE that is attached to a GPRS network moves to a EPS network:

the GGSN/PDN-GW has to informs PCRF about IP-CAN session modification due to change of RAT. The requested QoS will also include the AMBR in the first request.

the PCRF has to make PCC rule binding in case of any policy change due to the new RAT type. AMBR might also be modified.

Figure 3:
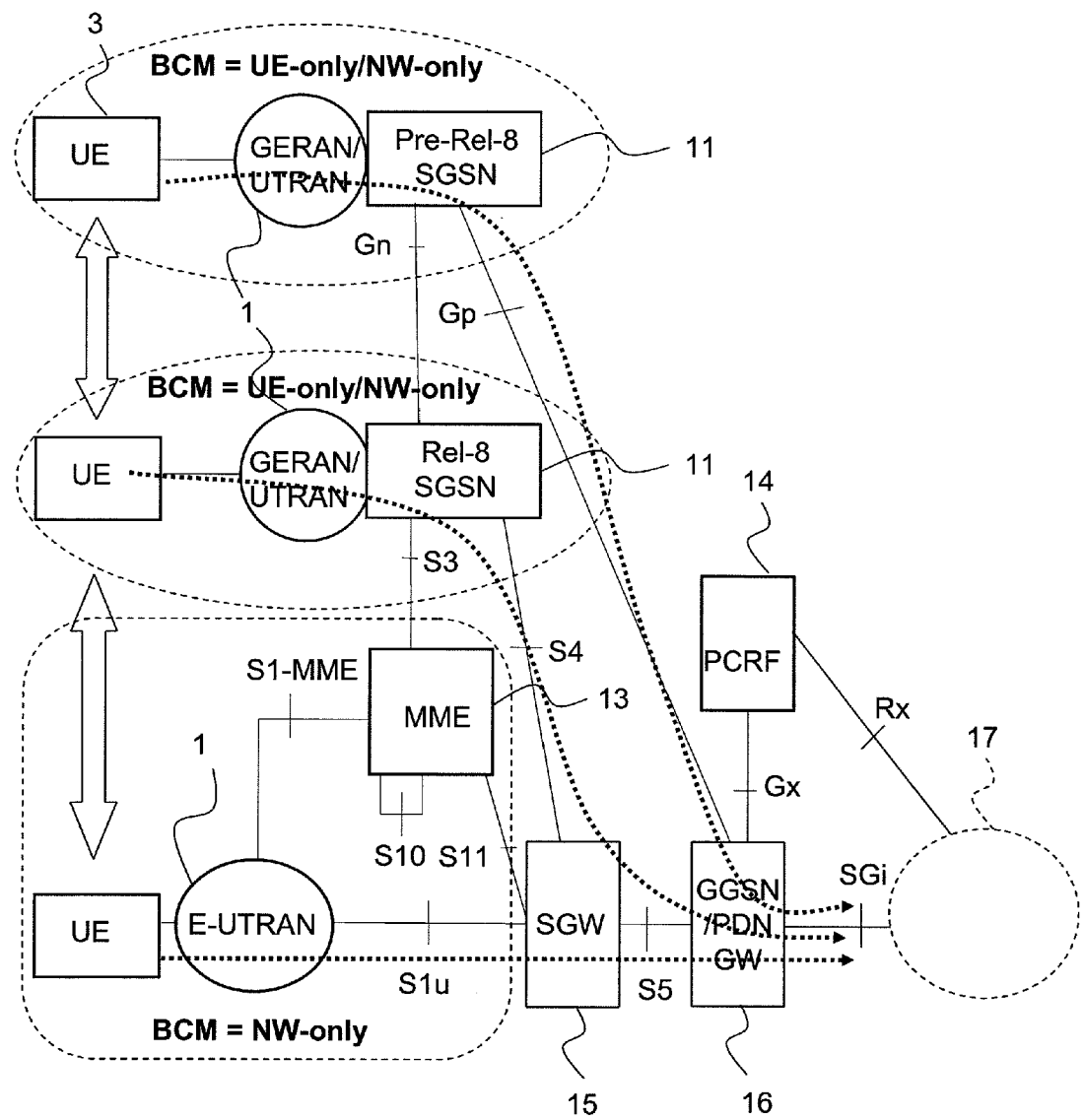
FIG. 3 illustrates schematically a network/signaling diagram to one embodiment according of the present invention.
Figure 4:
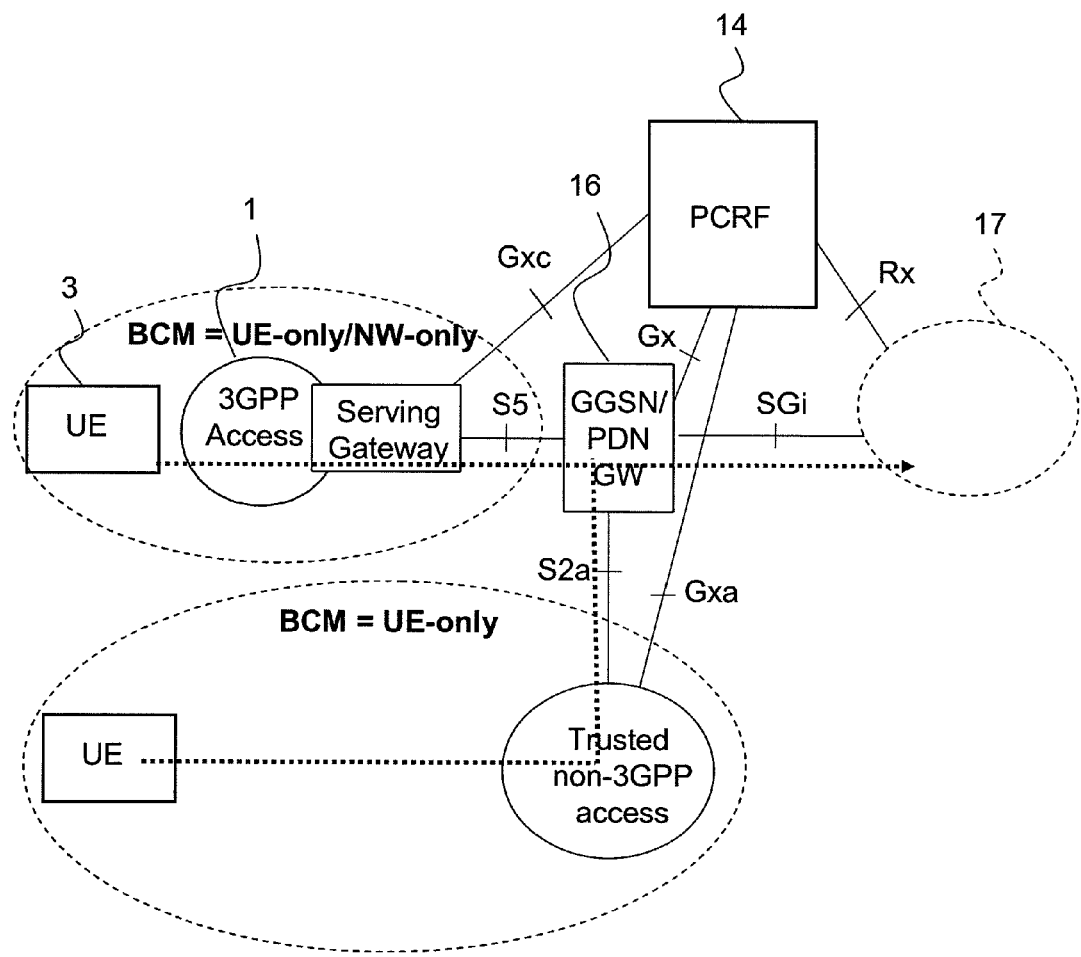
FIG. 4 illustrates schematically a network/signaling diagram according to another embodiment according of the present invention.

These solutions will now be exemplified with reference to different in scenarios, illustrated in FIGS. 3-4 and different example solutions as illustrate in FIGS. 6-10.

FIGS. 3 and 4 show some examples of scenarios of interest for the present invention, considering different access networks in EPS that may work in different bearer control modes. It should be realized by a person skilled in the art that the EPS user can also move to and from a GERAN/UTRAN access that works in a UE/NW only BCM:

1. An EPS user 3 attached from E-UTRAN access moves to a GERAN/UTRAN access that works in UE-only BCM.
2. An EPS user 3 attached from GERAN/UTRAN access that works in UE-only BCM moves to an E-UTRAN access.
3. An EPS user 3 attached from GERAN/UTRAN working in UE-only BCM moves to a GERAN/UTRAN working in NW-only BCM.
4. An EPS user 3 attached from GERAN/UTRAN working in NW-only BCM moves to a GERAN/UTRAN working in UE-only BCM.
5. An EPS user 3 attached from E-UTRAN access moves to a GERAN/UTRAN access that works in UE-only BCM.
6. An EPS user 3 attached from GERAN/UTRAN access that works in UE only BCM moves to an E-UTRAN access.
7. An EPS user 3 moves from 3GPP2 access network to E-UTRAN access.
8. An EPS user 3 moves from E-UTRAN access network to 3GPP2 network.

FIG. 3 illustrates a scenario of a UE 3 moving from different 3GPP accesses where Gx interface is used. Current Release 8 TS 23.401 covers the inter-working with pre-Rel-8 networks, i.e. GERAN/UTRAN from Rel-7 or before. Although nothing is stated for Rel-8 GERAN/UTRAN it is assumed here that the same scenarios would apply, as the SGSN Rel-8 in principle could not support the NW-only BCM.

For the case of accessing through a Rel-8 GPRS network, it should also be considered the case when the interface between the S-GW and the PDN-GW is PMIP-based. FIG. 4 illustrates a scenario where a UE 3 is moving from different accesses, different BCM are selected and Gxx interface is used The two concept solutions earlier disclosed illustrate the basic concept of the present invention. In the following, different example solutions with illustrative scenarios will be described.

Bearer Binding Control Delegation Solution

These example scenarios are based on the delegation of the bearer control mode to a different entity (PCRF or GGSN/PDN-GW) according to the principles used in Rel-7, that is, the PCRF will make the bearer binding when the bearer control mode is UE-only, and the GGSN/PDN-GW will make the bearer binding when the bearer control mode is NW-only. Neither the terminal nor the different involved entities to the GGSN/PDN-GW will be impacted nor will be aware about the bearer binding control delegation, as the IP-CAN session will be kept alive.

The following sub-sections analyze the different examples of scenarios, with reference to FIGS. 3-4 and also with reference to below mentioned figures. Reference 17 in FIGS. 3-4 relates to an operator's IP services (e.g. IMS, PSS etc.).

In these scenarios, the first gateway node is exemplified by a GW, such as a GGSN and/or a PDN-GW. The second gate node is exemplified by a SGSN or a S-GW and the policy control node is exemplified by a PCRF. The UE is exemplified by an EPS subscriber. It should furthermore be realized by a person skilled in the art that bearer control mode can also be UE/NW-only, in which mode the GW also makes the bearer binding. The UE being handover may be adapted for work in UE initiation, see FIGS. 6-10.

1. MME to SGSN Handover (FIG. 3, Scenario 1)

Figure 6:
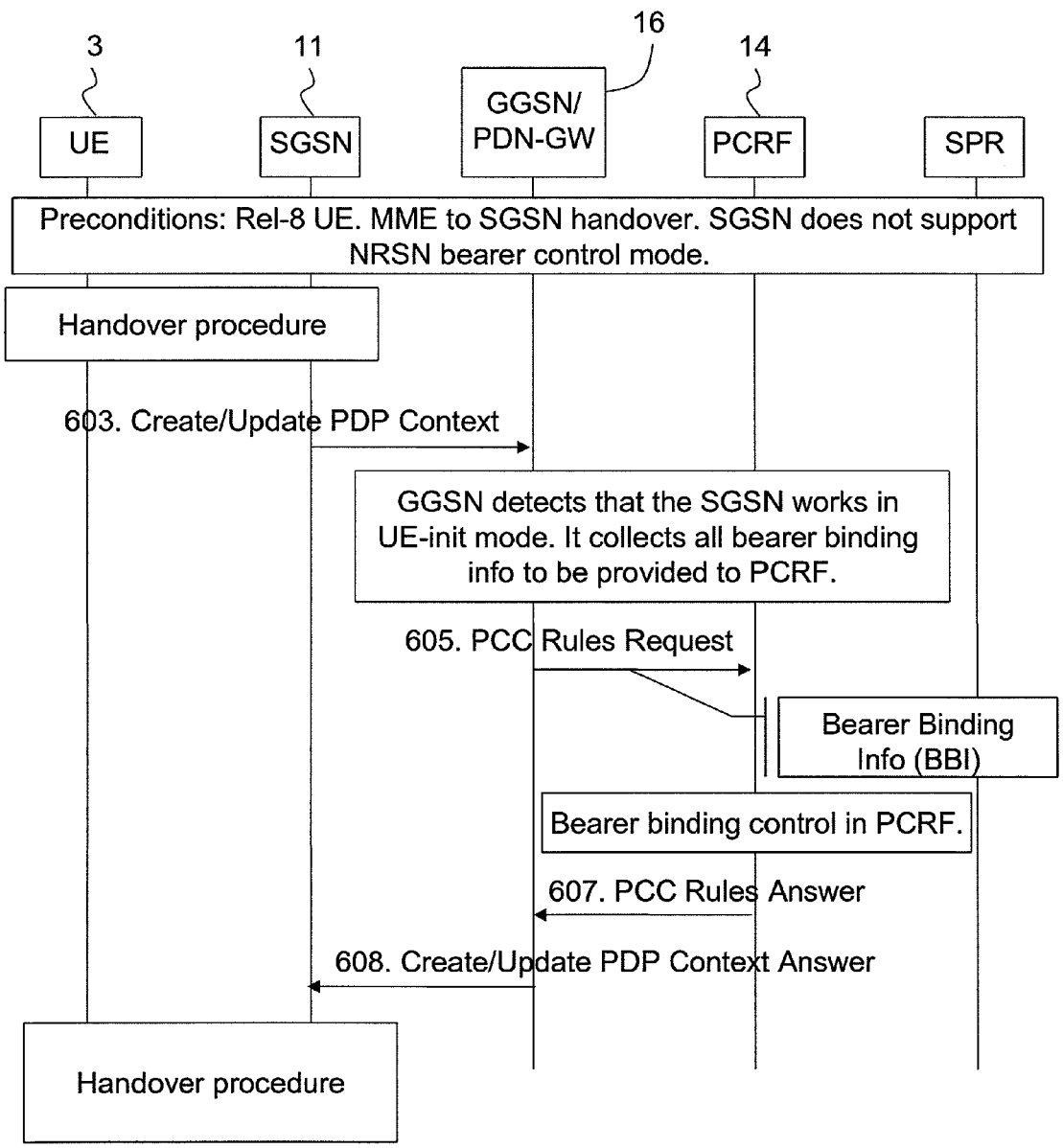
FIG. 6 illustrates schematically a signaling diagram according to an embodiment according of the present invention.

FIG. 6 shows the case where an EPS subscriber 3 moves from an E-UTRAN access to a GERAN/UTRAN access. The same flow would occur if the user attaches directly to a GERAN/UTRAN and initiates a PDP connection.

In this case, the SGSN 11 the user 3 is accessing does not support the Network-initiated Bearer Control Mode, i.e. the terminal has to initiate the bearer procedures. This SGSN can be a pre-Rel 8 SGSN (then it contacts directly with the GGSN/PDN-GW 16 through the Gn/Gp interface) or a Rel-8 SGSN (then it contacts the GGSN/PDN-GW via the S-GW 15 through the S4 interface).

When the GGSN/PDN-GW 16 receives the request, it detects that the SGSN 11 only works in UE-only mode (UE initiated BCM procedure). If the user 3 is moving from an E-UTRAN network, the GGSN/PDN-GW will already have bearer information for that user. In this case, it collects all that bearer information stored and sends it to the PCRF 14. The information to be provided includes: active bearer identifiers, authorized QoS information per bearer, active PCC rules per bearer.

If the user 3 is attaching directly to a GERAN/UTRAN network and initiates a PDP connection, the GGSN 16 will provide the bearer Id corresponding to that general bearer, and the requested bearer QoS.

In both cases, the PCRF 14 is informed that the Bearer Control Mode is UE-only, and thus it will assume the bearer binding control. From that moment onwards, the PCRF will work as for Rel-7 standard working in UE-only mode.

The example solutions 2-4 below illustrate a scenario when the GW 16 makes the bearer binding. The GW firstly receives handover information indicative of a handover of the user equipment 3 between two radio access networks (GERAN/UTRAN/E-UTRAN). The GW secondly determines a bearer control mode on the basis of the handover information. The GW thirdly transmits control information determined on the basis of the bearer control mode to the PCRF 14. The GW then controls the bearer binding on the basis of the bearer control mode.

Moreover, the S-GW 15 or SGSN 11 determines and transmits the handover information determined on the basis of the handover of the UE 3. The control information comprises a policy request, wherein the policy request comprises policy rules. The PCRF 14 transmits a policy answer to the GW 16 in response to the policy request. The policy answer comprises policy rules.

2. SGSN to MME Handover (FIG. 3, Scenario 2)

Figure 7:
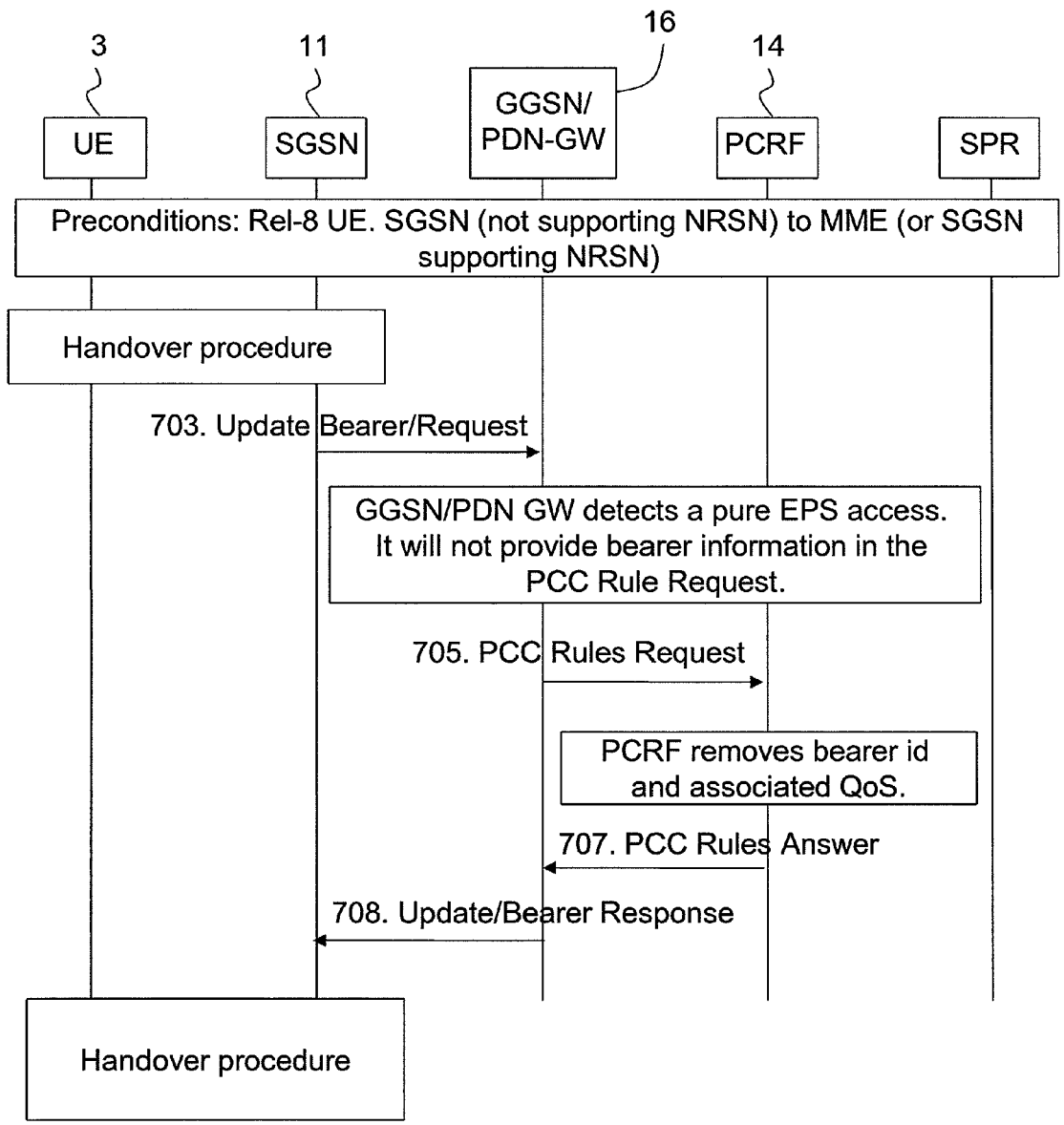
FIG. 7 illustrates schematically a signaling diagram according to another embodiment according of the present invention.
Figure 8:
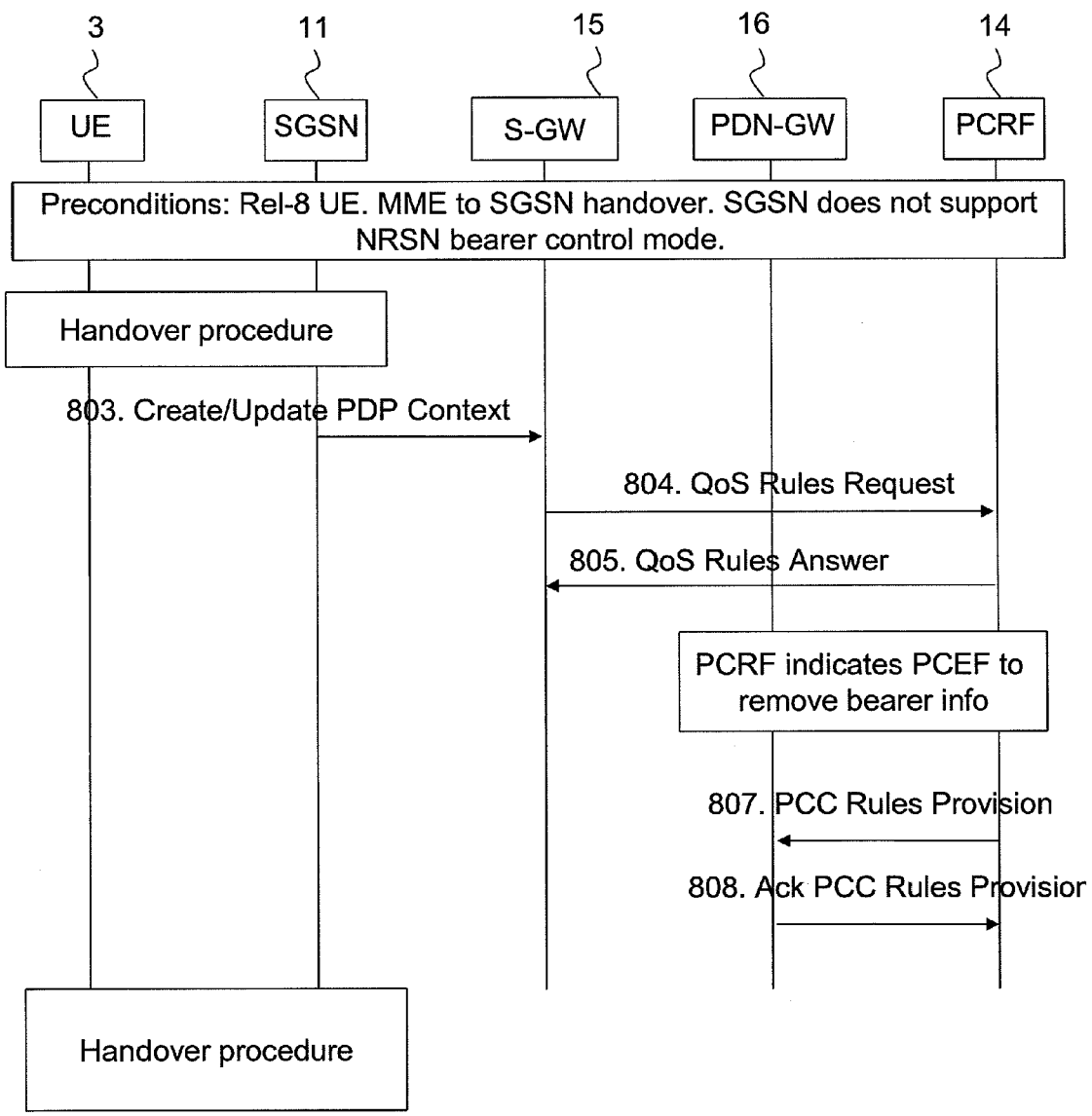
FIG. 8 illustrates schematically a signaling diagram according to another embodiment according of the present invention.

FIG. 7 shows a case where the user 3 is moving (handover) from a GERAN/UTRAN network that works in UE-only mode to an E-UTRAN network, or a GERAN/UTRAN where the Bearer Control Mode is NW-init. When the GGSN/PDN-GW 16 receives the request, it detects that this is an E-UTRAN access, and thus the Bearer Control Mode must be NW-Init (BCM procedure). If it is a GERAN/UTRAN access, the BDM is also NW-init (BCM procedure). As the IP-CAN session for that user was working in UE-only mode, the bearer binding control must be delegated from the PCRF 14 to the GGSN/PDN-GW 16. Thus PCRF will be informed about the new Bearer Control Mode, and the Event Trigger will indicate the new RAT type.

The PCRF 14 will remove all the bearer information, i.e. bearer identifiers, and associated bearer QoS. From that moment onwards, the PCRF will work as for Rel-7 standard working in NW-only mode.

3. MME to SGSN Handover (PMIP S5 in EPS Network) (FIG. 4 Scenario 5)

This case (illustrated in FIG. 8) is the same as in scenario example 1. That is, an EPS subscriber 3 moves from an E-UTRAN access to a GERAN/UTRAN access. Moreover, when the GGSN/PDN-GW 16 receives the request, it detects that the SGSN 11 only works in UE-only mode (UE initiated BCM procedure).

However, some impacts must be considered when there is PMIP between the S-GW 15 and the PDN-GW 16 instead of GTP. In these PMIP cases, it is the S-GW the entity that makes the bearer binding, instead of the PDN-GW. That means that the bearer binding control delegation must be done between the S-GW and the PCRF 14.

This situation is applicable when the SGSN 11 is Rel-8, as the standard does not consider the case that a pre-Rel-8 SGSN 11 can interface with a PMIP-based EPS network.

PCRF 14 behavior is the one defined in clause 1, with the exception that it will send the QoS rules instead of the PCC rules towards the S-GW 15, as defined in the standard. Afterwards, the PCRF 14 will send the modified PCC rules towards the PDN-GW 16. It has to indicate to the PCEF that the bearer QoS information is not valid anymore. PDN-GW will remove that info.

4. SGSN to MME Handover (PMIP Case) (FIG. 2 Scenario 6)

Figure 9:
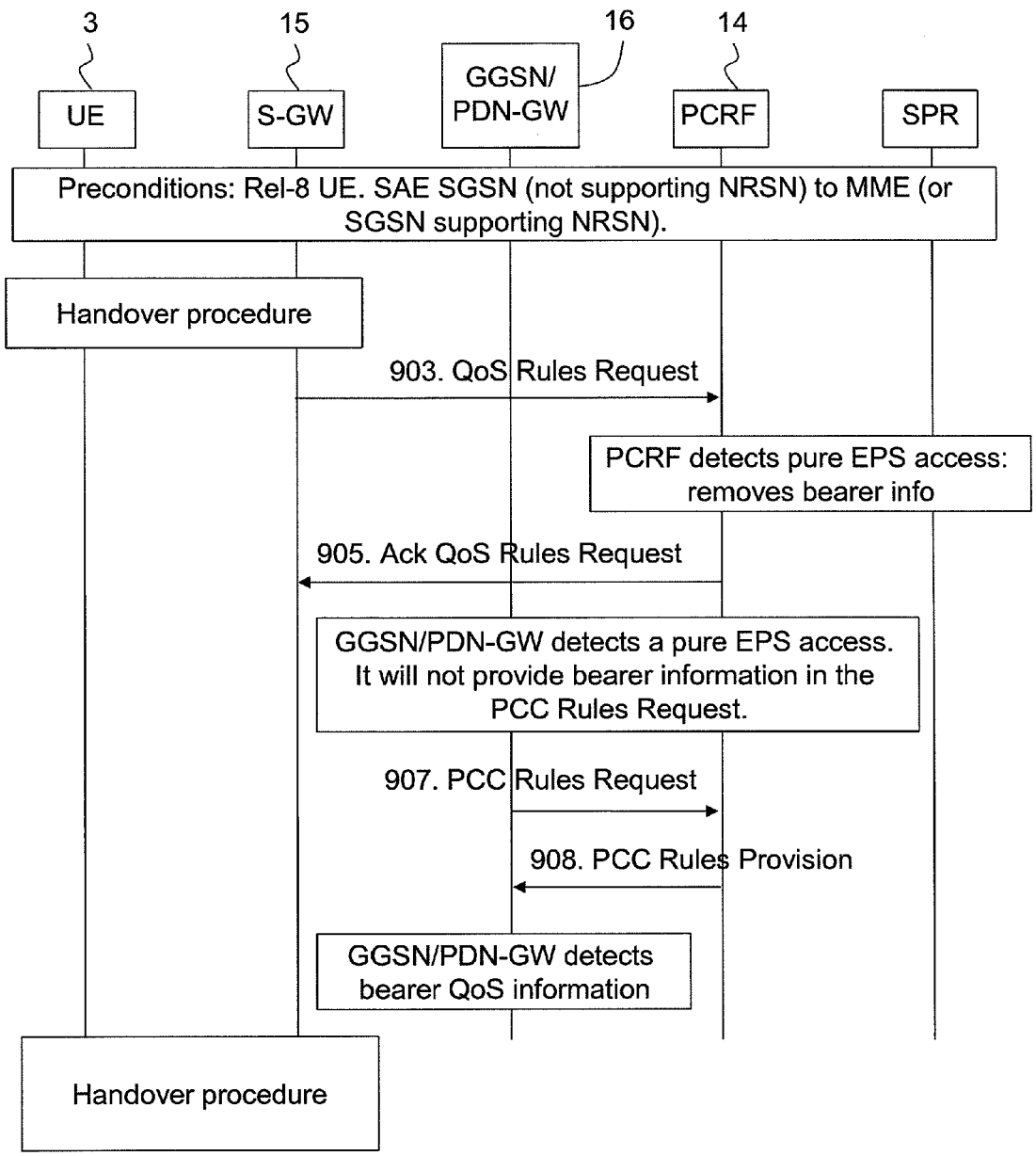
FIG. 9 illustrates schematically a signaling diagram according to another embodiment according of the present invention.

This case, see FIG. 9, is the same as scenario example 2. That is, the user 3 is moving (handover) from a GERAN/UTRAN network that works in UE-only mode to an E-UTRAN network or a GERAN/UTRAN where the Bearer Control Mode is NW-init (see FIG. 9). Moreover, when the GGSN/PDN-GW 16 receives the request, it detects that this is an E-UTRAN access, and thus the Bearer Control Mode must be NW-Init (BCM procedure). Finally, if it is a GERAN/UTRAN access, the BDM is also NW-init (BCM procedure).

This case has the impacts of having PMIP between S-GW 15 and PDN-GW 16. In this case, the bearer binding control has to be moved from PCRF 14 to S-GW 15. As in the previous case, the situation is applicable when the SGSN 11 is Rel-8. FIG. 9 describes this case.

As the PCRF 14 had the bearer binding control in the GERAN/UTRAN access, it has to delete all the bearer information when receiving the QoS request from the S-GW 15. QoS rules and PCC rules will be modified as described in clause 4.1.3. Afterwards, when receiving the PCC Rule Request from the GGSN/PDN GW 16, the modified PCC rules will be provided. GGSN/PDN GW has to delete the bearer QoS information, as it is the S-GW the entity responsible for bearer binding.

Bearer Agnostic PCRF

This solution, see FIG. 3, is based on hiding the bearer control mode over Gx and Gxx interfaces. The PCRF 14 does not handle the BCM any longer, so that always installs/modifies or removes PCC/QoS Rules on BBERF/PCEF (not shown) associated with an IP-CAN session. The BBERF/PCEF performs bearer binding in all cases. With the term bearer agnostic is meant: work the same, irrespective of bearer mode, whether connected over 2G, 2.5G, 3G, Wi-Fi, WiMAX, or any other suitable bearer mode within the concept of the present invention.

This solution requires placing requirements:
On BBERF/PCEF that should avoid informing PCRF 14 that the bearer control mode has been modified from NW-only to UE-only or vice versa.
On PCEF that should retrieve PCC Rules from the PCRF without including the bearer-id at PDP context activation/modification or deactivation received from the SGSN when the BCM is set to UE-only.
On BBERF that should retrieve QoS Rules from the PCRF without including the bearer-id at PDP context activation/modification or deactivation received from the SGSN when the BCM is set to UE-only.

Figure 10:
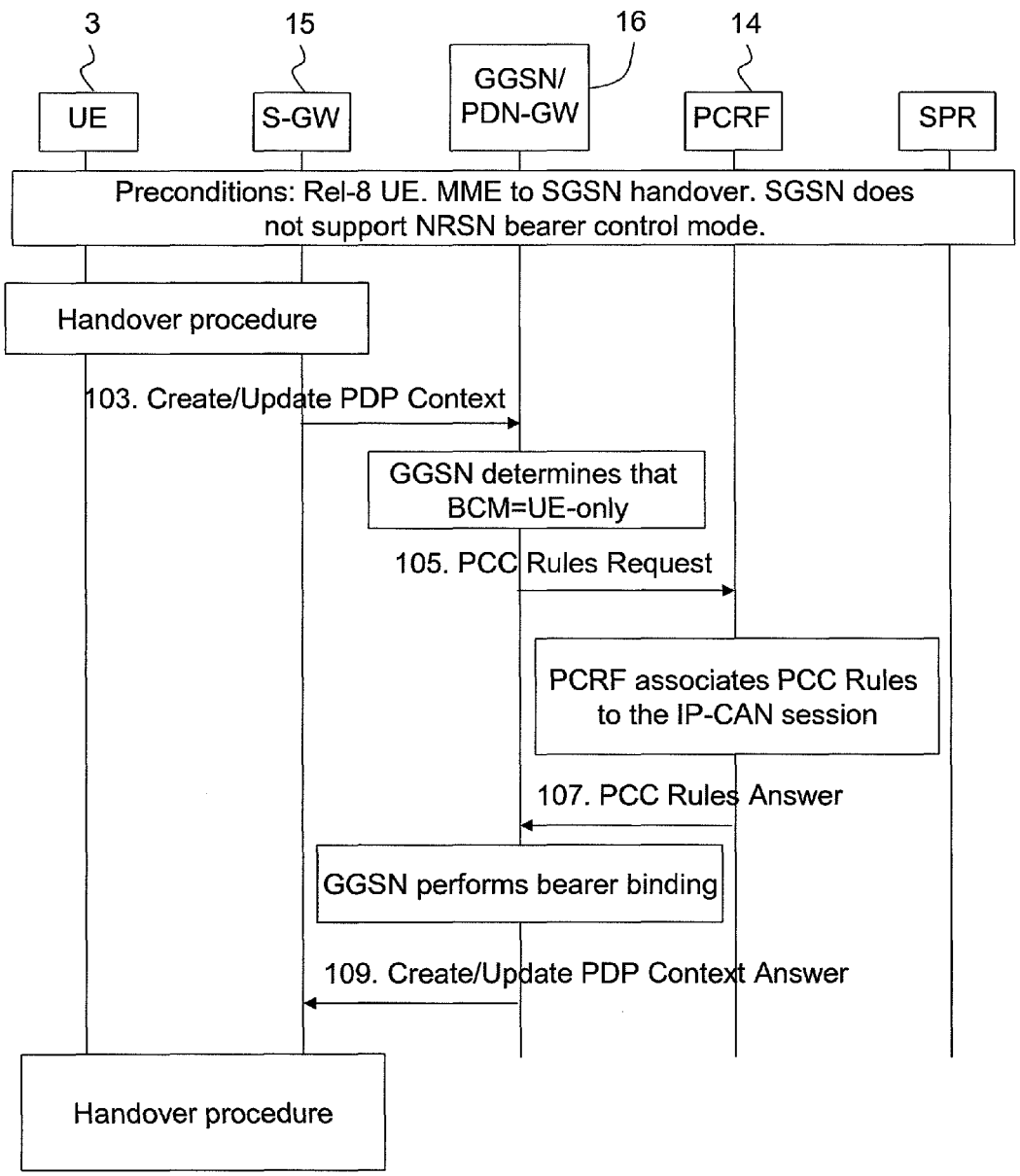
FIG. 10 illustrates schematically a signaling diagram according to another embodiment according of the present invention.

FIG. 10 shows an example of a flow of information when the PDN-GW 16 receives an indication that the SGSN 11 does not support NW-init mode, then the BCM is set to UE-only.

Figure 5:
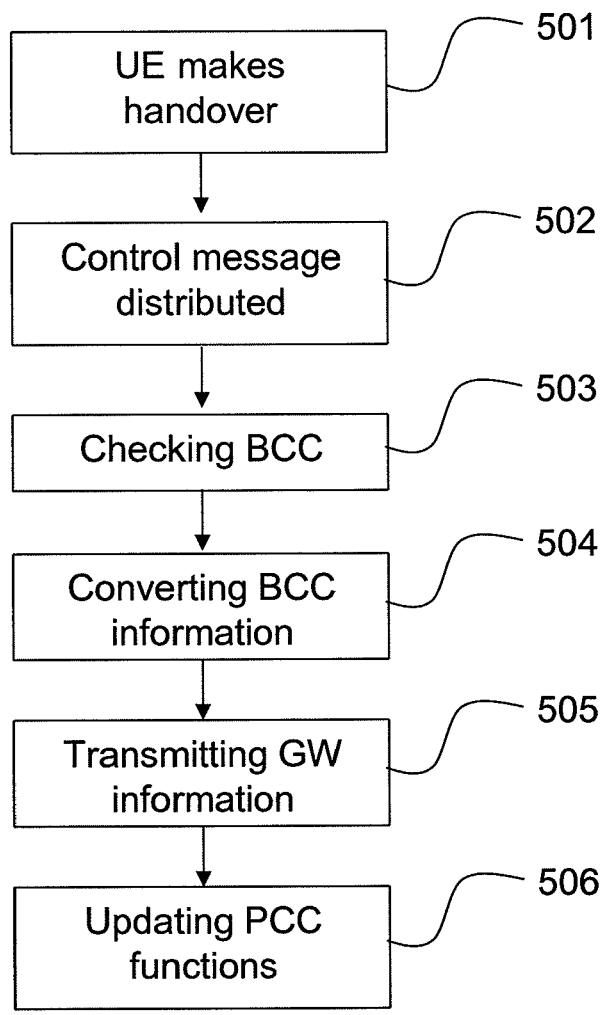
FIG. 5 illustrates schematically a method according to another embodiment according of the present invention.

FIG. 5 illustrates schematically one embodiment of a method according to the present invention, comprising the steps of:

501. A UE makes a handover from one connection mode to another;
502. Control messages are distributed in the infrastructure network accordingly;
503. Checking the bearer control mode of the UE in a gateway;
504. Converting bearer control mode information to agnostic bearer control information.
505. Transmitting from the gateway information about the bearer control mode to a policy and charging control device.
506. Updating policy and charging control functions in the network (e.g. in the PCC) by for instance using a PCRF.

Figure 11:
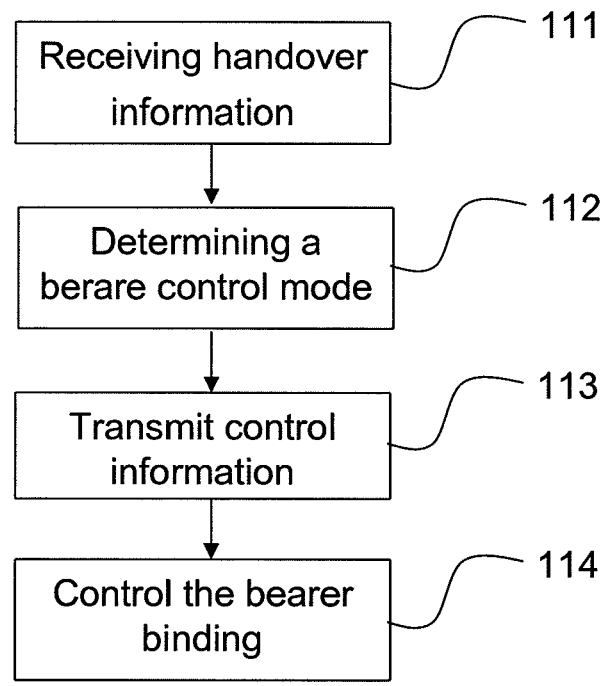
FIG. 11 schematically illustrates the method for handling handover of a user equipment, UE.

FIG. 11 schematically illustrates the method for handling handover of a user equipment, UE 3, communicating wirelessly with an infrastructure network 4, according to the present invention. It comprises the steps of:

a first gateway node 16 receiving 111 handover information indicative of a handover of the user equipment 3 between two radio access networks 1,
the first gateway node 16 determining 112 a bearer control mode on the basis of the handover information,
the first gateway node 16 transmitting 113 control information determined on the basis of the bearer control mode to a policy control node 14,
the first gateway node 16 controlling 114 the bearer binding on the basis of the bearer control mode.

The invention further relates to the gateway node 16 being adapted to for handle handover of a user equipment, UE 3, communicating wirelessly with an infrastructure network 4. The gateway node 16 further is adapted to receive handover information indicative of a handover of the user equipment 3 between two radio access networks 1, determine a bearer control mode on the basis of the handover information, transmit control information determined on the basis of the bearer control mode to a policy control node 14 and control the bearer binding on the basis of the bearer control mode.

The invention further relates to the policy control node 14 being adapted to handle handover of a user equipment, UE 3, communicating wirelessly with an infrastructure network 4. A policy control node 14 further is adapted to receive control information from a gateway node 16, the information being determined on the basis of a bearer control mode indicating a handover of the user equipment 3 between two radio access networks 1.

The invention finally relates to the infrastructure network 4 being adapted to handle handover of a user equipment, UE 3, communicating wirelessly with the infrastructure network 4, the network comprising at least one gateway node 16 and at least one policy control node 14, the network further being adapted to:
  receive in a first gateway node 16 handover information indicative of a handover of the user equipment 3 between two radio access networks 1,
  determine in the first gateway node 16 a bearer control mode on the basis of the handover information,
  transmit from the first gateway node 16 control information determined on the basis of the bearer control mode to the policy control node 14,
  control in the first gateway node 16 the bearer binding on the basis of the bearer control mode.

A signal is transmitted over the infrastructure network between suitable network entities as described above in order to transmit the bearer control mode information. It should be appreciated that the steps above are not mandatory for all variations of scenarios but they may be optionally depending on scenario and network configuration.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, and that several "means", "devices", and "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The following example embodiments are intended to further illustrate the present invention, see FIG. 2:

1. A gateway node 16 in a wireless communication network, comprising a processor 201; at least one memory unit 202 and at least one communication interface 204,205. The processor is arranged to operate instructions stored in the memory unit for communicating control signals over the communication interface and wherein the processor is further arranged to operate instructions for analyzing a bearer control mode of a user equipment 3 communicating with the wireless communication network and inform a policy and/or charging control device 14 with bearer mode information.

2. A policy and charging control device 14 in a wireless communication network, comprising a processor 201; at least one memory unit 202 and at least one communication interface 204, 205. The processor is arranged to operate instructions stored in the memory unit for communicating control signals over the communication interface and wherein the processor is further arranged to operate instructions for receiving information relating to bearer control mode from a gateway node 16.

3. A method for handling handover of a user equipment communicating wirelessly with an infrastructure network, comprising the steps of:
  receiving control messages in a gateway node in the infrastructure network indicating handover of a user equipment from one access network to another;
  controlling in the gateway node the bearer control mode of the connection;
  optionally in the gateway node converting a packet data connection request to a bearer agnostic request;
  transmitting from the gateway node information relating to the bearer control mode and/or the bearer agnostic request to a policy and charging control device over the infrastructure network.

4. A system for handling handover in a mixed wireless communication network, comprising: a gateway node 16, a policy and charging control device 14 and an infrastructure network 4. The gateway node and policy and charging control device are arranged to communicate with each other over the infrastructure network and where the gateway node is arranged to communicate information about a bearer control mode of a user equipment to the policy and charging control device.

| ABBREVIATIONS AND DEFINITIONS | |
|---|---|
| AAA | Access, Authorization, and Accounting |
| BS | Base station |
| EPC | Evolved Packet Core |
| EPS | Enhanced Packet System |
| GGSN | Gateway GPRS Support Node |
| GW | Gateway |
| HO | Hand-over or Handoff |
| HSS | Home Subscriber Server |
| IP | Internet Protocol |
| I-WLAN | interworking WLAN |
| LTE | Long Term Evolution |
| MM | Mobility management |
| MME | Mobility Management Entity |
| PDN-GW | Packet Data Network-Gateway |
| RNC | Radio Network Controller |
| SAE | System Architecture Evolution |
| SGSN | Serving GPRS Support Node |
| TAU | Tracking-Area Update |
| UE | User Equipment |
| UP | User Plane |
| WLAN | Wireless Local Area Network |
| AMBR | Aggregated Maximum Bit Rate |
| ARP | Allocation Retention Priority |
| BBERF | Bearer Binding and Event Reporting Function |
| BCM | Bearer Control Mode |
| EPS | Evolved Packet System |
| E-UTRAN | Evolved Universal Terrestrial Radio Access Network |
| GBR | Guaranteed Bit Rate |
| GERAN | GSM EDGE Radio Access Network. |
| GGSN | Gateway GPRS Support Node |
| GTP | GPRS Transport Protocol |
| GW | Gateway |
| IP | Internet Protocol |
| IPCAN | IP Connectivity Access Network |
| MME | Mobility Management Entity |
| NRS | Support of Network Request Bearer Control |
| NW | Network |
| PCC | Policy and Charging Control |
| PCEF | Policy and Charging Enforcement Function |
| PCRF | Policy and Charging Rules Function |
| PDP | Packet Data Protocol |
| PMIP | Proxy Mobile IP |
| QCI | QoS Class Identifier |
| QoS | Quality of Service |
| RAT | Radio Access Technology |
| SGSN | Serving GPRS Support Node |
| S-GW | Serving GW |
| TFT | Traffic Flow Template |
| UE | User Equipment |
| UTRAN | Universal Terrestrial Radio Access Network |
| Rx: | Reference point b between AF and PCRF |
| Gx: | Reference point between PCRF and GGSN/PDN-GW |
| Gxc: | Reference point between PCRF and S-GW |
| Gxa: | Reference point between PCRF and non-3GPP access |

The invention claimed is:

1. A method for handling handover of a user equipment communicating wirelessly with an infrastructure network, comprising the steps of:
  a first gateway node receiving handover information indicative of a handover of the user equipment from a first radio access network to a second radio access network, the first gateway node determining a bearer control mode supported by the second radio access network on a basis of the handover information, the first gateway node transmitting control information determined on a basis of the bearer control mode to a policy control node, and the first gateway node controlling a bearer binding on the basis of the bearer control mode.

2. The method according to claim 1 comprising the step of:
a mobility control node determining and transmitting the handover information determined on a basis of the handover of the user equipment.

3. The method according to claim 1 wherein the control information comprises a policy request.

4. The method according to claim 3 wherein the policy request comprises policy rules.

5. The method according to claim 3 wherein the policy control node transmits a policy answer to the first gateway node in response to the policy request.

6. The method according to claim 5 wherein the policy answer comprises policy rules.

7. The method according to claim 1 wherein the user equipment is handed over from an Evolved Universal Terrestrial Radio Access Network (E-UTRAN) to a GSM EDGE Radio Access Network (GERAN) or a UMTS Terrestrial Radio Access Network (UTRAN).

8. The method according to claim 7 wherein the step of determining and transmitting the control information comprises the step of:
the first gateway node detecting that a mobility control node is working in the user equipment initiated Bearer Control Mode (BCM) procedure.

9. The method according to claim 1 wherein the user equipment is handed over from a GSM EDGE Radio Access Network (GERAN) or a UMTS Terrestrial Radio Access Network (UTRAN) to a GERAN or a UTRAN or an Evolved Universal Terrestrial Radio Access Network (E-UTRAN).

10. The method according to claim 9 wherein the step of determining and transmitting the control information comprises the steps of:
the first gateway node detecting that a mobility control node is working in the network initiated Bearer Control Mode (BCM) procedure.

11. A gateway node for handling handover of a user equipment communicating wirelessly with an infrastructure network, the gateway node comprising:
a processor;
a memory unit having instructions stored therein that, when executed by the processor, cause the gateway node to:
receive handover information indicative of a handover of the user equipment from a first radio access network to a second radio access network,
determine a bearer control mode supported by the second radio access network on a basis of the handover information,
transmit control information determined on a basis of the bearer control mode to a policy control node, and
control a bearer binding on the basis of the bearer control mode.

12. A policy control node being adapted to handle handover of a user equipment communicating wirelessly with an infrastructure network, the policy control node comprising:
a processor;
a memory unit having instructions stored therein that, when executed by the processor, cause the gateway node to:
receive control information from a gateway node, the control information being determined on a basis of a bearer control mode supported by a first radio access network,
wherein the bearer control mode is determined on a basis of handover information received by the gateway node and indicating a handover of the user equipment from a second radio access network to the first radio access network.

13. An infrastructure network being adapted to handle handover of a user equipment communicating wirelessly with an infrastructure network, the network comprising at least one gateway node and at least one policy control node, the infrastructure network being adapted to:
receive in a first gateway node handover information indicative of a handover of the user equipment from a first radio access network to a second radio access network,
determine in the first gateway node a bearer control mode supported by the second radio access network on a basis of the handover information,
transmit from the first gateway node control information determined on a basis of the bearer control mode to the at least one policy control node, and
control in the first gateway node a bearer binding on the basis of the bearer control mode.

* * * * *

UNITED STATES PATENT AND TRADEMARK OFFICE
CERTIFICATE OF CORRECTION

PATENT NO. : 8,700,040 B2  
APPLICATION NO. : 12/990314  
DATED : April 15, 2014  
INVENTOR(S) : Pancorbo Marcos et al.

Page 1 of 1

It is certified that error appears in the above-identified patent and that said Letters Patent is hereby corrected as shown below:

In the Specification

In Column 12, Line 58, insert -- PCC Rule binding: It is the procedure to match a list of TFT provided by the UE against the SDF's of the generated PCC Rules that are waiting to be installed in the PCEF. --.

Signed and Sealed this  
Second Day of September, 2014

Michelle K. Lee  
*Deputy Director of the United States Patent and Trademark Office*